United States Patent [19]

Flotow et al.

[11] Patent Number: 5,097,932
[45] Date of Patent: Mar. 24, 1992

[54] VENTILATED SUPPORT PLATE FOR CLUTCH

[75] Inventors: Richard A. Flotow, Butler; Kevin F. Schlosser, Auburn, both of Ind.

[73] Assignee: Dana Corporation, Toledo, Ohio

[21] Appl. No.: 677,310

[22] Filed: Mar. 29, 1991

[51] Int. Cl.⁵ .............................................. F16D 3/14
[52] U.S. Cl. ........................... 192/106.2; 192/70.12; 192/107 C; 192/113 A; 188/218 XL
[58] Field of Search ............ 192/106.2, 107 C, 107 R, 192/109 B, 113 A, 70.12; 188/218 XL

[56] References Cited

U.S. PATENT DOCUMENTS

| | | | |
|---|---|---|---|
| 1,899,274 | 2/1933 | Hook et al. | 192/107 C |
| 2,584,906 | 2/1952 | Narrin | 192/107 C |
| 2,835,355 | 5/1958 | Armstrong | 188/218 XL |
| 3,301,356 | 1/1967 | Pompa | 188/218 XL X |
| 3,426,875 | 2/1969 | Stürmer | 192/107 C |
| 4,379,501 | 4/1983 | Hagiwara et al. | 188/218 XL |
| 4,967,892 | 11/1990 | Tojima et al. | 192/107 C |

*Primary Examiner*—Leslie A. Braun
*Assistant Examiner*—Andrea Pitts
*Attorney, Agent, or Firm*—MacMillan, Sobanski & Todd

[57] ABSTRACT

A clutch driven disc assembly includes a ventilated support plate and friction element to reduce the build up of heat during use. The support plate includes a plurality of radially extending paddles. A pair of friction elements are secured to the opposed sides of each of the paddles. Each paddle has a plurality of generally parallel slots formed therethrough. The slots may extend generally radially or generally circumferentially relative to the paddle. Each of the friction elements includes a corrugated backing plate having a friction facing secured thereto. The corrugations define a plurality of raised channels in the backing plate. The raised channels are formed such that they are aligned with the slots formed through the support plate when the friction elements are secured to the paddle. Such alignment provides a plurality of channels for the passage of air therethrough as the driven disc assembly rotates during use. Such air flow is helpful in cooling the friction facings when the clutch is engaged and disengaged.

22 Claims, 3 Drawing Sheets

VENTILATED SUPPORT PLATE FOR CLUTCH

BACKGROUND OF THE INVENTION

This invention relates in general to friction clutches and in particular to an improved structure for a support plate and friction element for a driven disc assembly in such a clutch.

Clutches are well known devices which are frequently employed in vehicles to selectively connect a source of rotational power, such as the crankshaft of an engine, to a driven mechanism, such as a transmission. Typically, a cover of the clutch is connected to a flywheel carried on the end of the engine crankshaft for rotation therewith. Between the flywheel and the clutch cover, a pressure plate is disposed. The pressure plate is connected for rotation with the flywheel and the cover, but is permitted to move axially relative thereto. A shift lever assembly is provided for selectively moving the pressure plate back and forth in the axial direction.

A driven disc assembly is disposed within the clutch between the pressure plate and the flywheel. The driven disc assembly is carried on an output shaft of the clutch, which forms the input to the transmission. The driven disc assembly includes a hub, which is splined onto the output shaft, and a support plate which is mounted on the hub for limited rotational movement. A plurality of friction elements are usually secured to the outer ends of the support plate. Springs or similar torsion dampening devices are provided between the support plate and the hub. When the pressure plate is moved toward the flywheel, the friction elements of the support plate are frictionally engaged therebetween so as to cause the output shaft of the clutch to rotate with the flywheel, the cover, and the pressure plate. When the pressure plate is moved away from the flywheel, the driven disc assembly is released from such frictional engagement so as to disconnect this driving connection.

As the driven disc assembly is engaged and disengaged, friction causes heat to be generated. Excessive heat can cause a breakdown in the facings of the friction element. Heat can also cause warping and cracking of the support plate, resulting in premature failure. Accordingly, it would be desirable to provide a driven disc assembly which reduces the amount of undesirable heat generated during frictional engagement and disengagement of the clutch.

SUMMARY OF THE INVENTION

This invention relates to an improved structure for a clutch driven disc assembly wherein the support plate and friction element are ventilated so as to reduce the build up of heat during use. The support plate includes a plurality of radially extending paddles. A pair of friction elements are secured to the opposed sides of each of the paddles. Each paddle has a plurality of generally parallel slots formed therethrough. The slots may extend generally radially or generally circumferentially relative to the paddle. Each of the friction elements includes a corrugated backing plate having a friction facing secured thereto. The corrugations define a plurality of raised channels in the backing plate. The raised channels are formed such that they are aligned with the slots formed through the support plate when the friction elements are secured to the paddle. Such alignment provides a plurality of channels for the passage of air therethrough as the driven disc assembly rotates during use. Such air flow is helpful in cooling the friction facings when the clutch is engaged and disengaged.

It is an object of this invention to provide an improved structure for a clutch driven disc assembly wherein the support plate and friction element are ventilated so as to reduce the build up of heat during use.

It is another object of this invention to provide such an improved clutch driven disc assembly which has less mass and, therefore, has a lower rotating inertia, than comparable driven disc assemblies.

It is a further object of this invention to provide such an improved clutch driven disc assembly which is capable of cushioning the impact thereto resulting from a sudden engagement of the clutch during use.

Other objects and advantages of this invention will become apparent to those skilled in the art from the following detailed description of the preferred embodiments, when read in light of the accompanying drawings.

BRIEF DESCRIPTION OF THE DRAWINGS

FIG. 6 is a front elevational view similar to FIG. 4 showing a third embodiment of the invention.

DETAILED DESCRIPTION OF THE PREFERRED EMBODIMENTS

Figure 1:
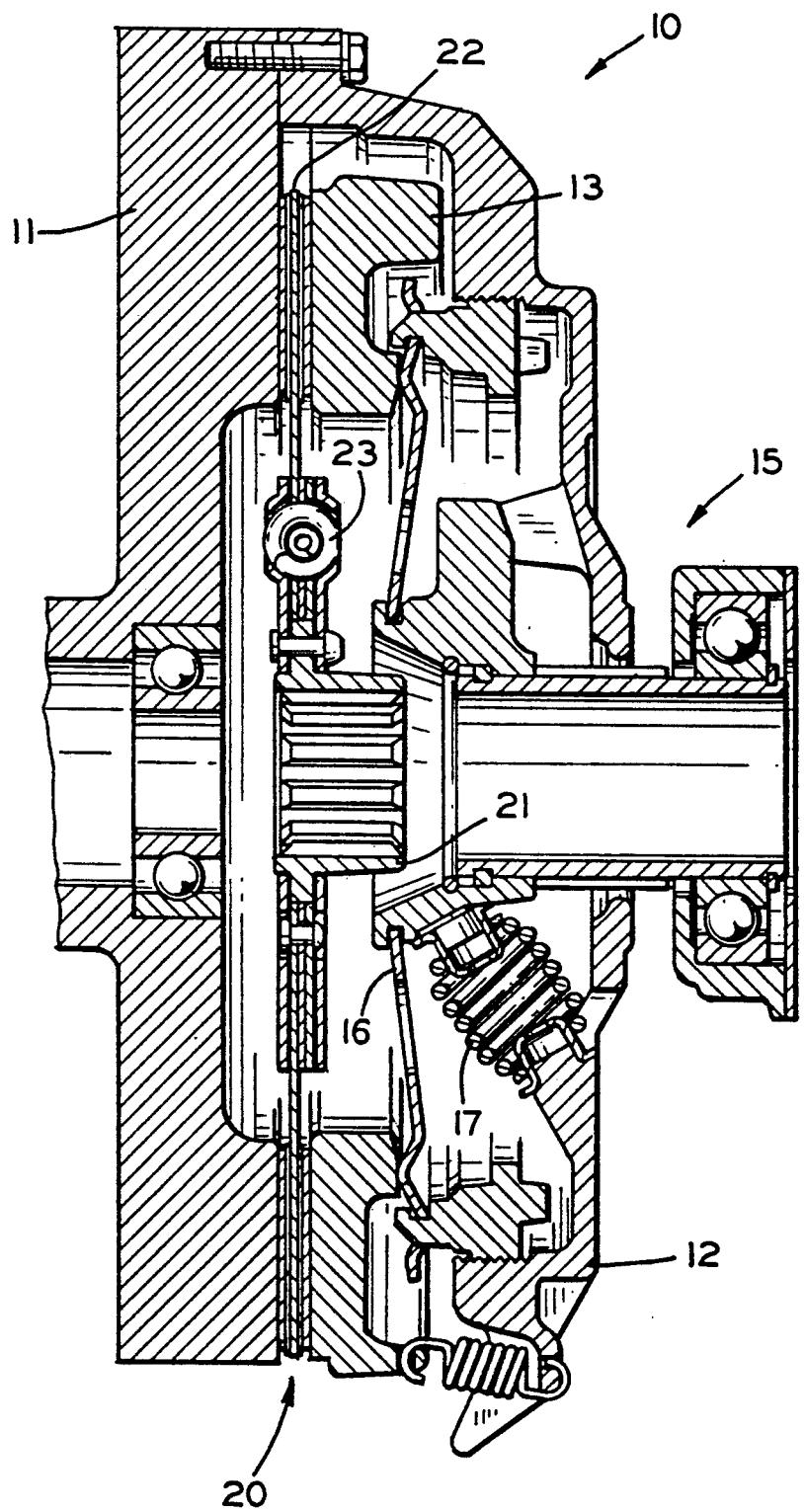
FIG. 1 is a sectional side elevational view of a friction clutch including an improved driven disc assembly in this invention.

Referring now to the drawings, there is illustrated in FIG. 1 a spring-loaded friction clutch, indicated generally at 10, which is adapted for use in a vehicle. The general structure and operation of the clutch 10 are well known in the art, and only those portions of the clutch 10 which are necessary for a complete understanding of this invention will be described here. The clutch 10 includes a flywheel 11, which may be connected to a crankshaft (not shown) of an engine of the vehicle or a similar source of rotational energy. Rotational movement of the crankshaft by the vehicle engine, therefore, causes corresponding rotational movement of the flywheel 11.

A cover 12 is connected to the flywheel for rotation therewith. A pressure plate 13 is disposed between the flywheel 11 and the cover 12. Means (not shown) are provided for connecting the pressure plate 13 to the cover 12 for rotation therewith, while permitting the pressure plate 13 to move axially relative thereto. An operating mechanism is provided for selectively moving the pressure plate 13 toward and away from the flywheel 11. The operating mechanism includes an axially movable release retainer assembly, indicated generally at 15, and a plurality of levers 16 (only two of which is illustrated). In a manner which is well known in the art, axial movement of the release retainer assembly 15 causes pivoting movement of the levers 16 and consequent axial movement of the pressure plate 13.

A plurality of angled springs 17 (only one is shown) extend between the cover 12 and the release retainer assembly 15. The angled springs 17 urge the release retainer assembly 15 (and, thus, the pressure plate 13) toward the flywheel 11. A shift lever assembly (not shown) or similar means is provided for selectively moving the release retainer assembly 15 and the pressure plate 13 away from the flywheel 11 against the urging of the angled springs 17.

A driven disc assembly, indicated generally at 20, is disposed between the flywheel 11 and the pressure plate 13. The driven disc assembly 20 includes a hub 21, a support plate 22 mounted on the hub 21 for limited relative rotational movement, and a plurality of springs 23 (only one is illustrated) connected between the hub 21 and the support plate 22. The hub 21 is splined or otherwise connected to an output shaft (not shown) of the clutch 10 for rotation therewith. As is well known, the springs 23 function to dampen torsional vibrations transmitted from the engine, while still providing a driving connection between the hub 21 and the support plate 22. Thus, when the pressure plate 13 is moved toward the flywheel 11, the driven disc assembly 20 is frictionally engaged therebetween, causing it (and the output shaft) to rotate with the flywheel 11, the cover 12, and the pressure plate 13. The structure of the clutch 10 thus far described is conventional in the art.

Figure 2:
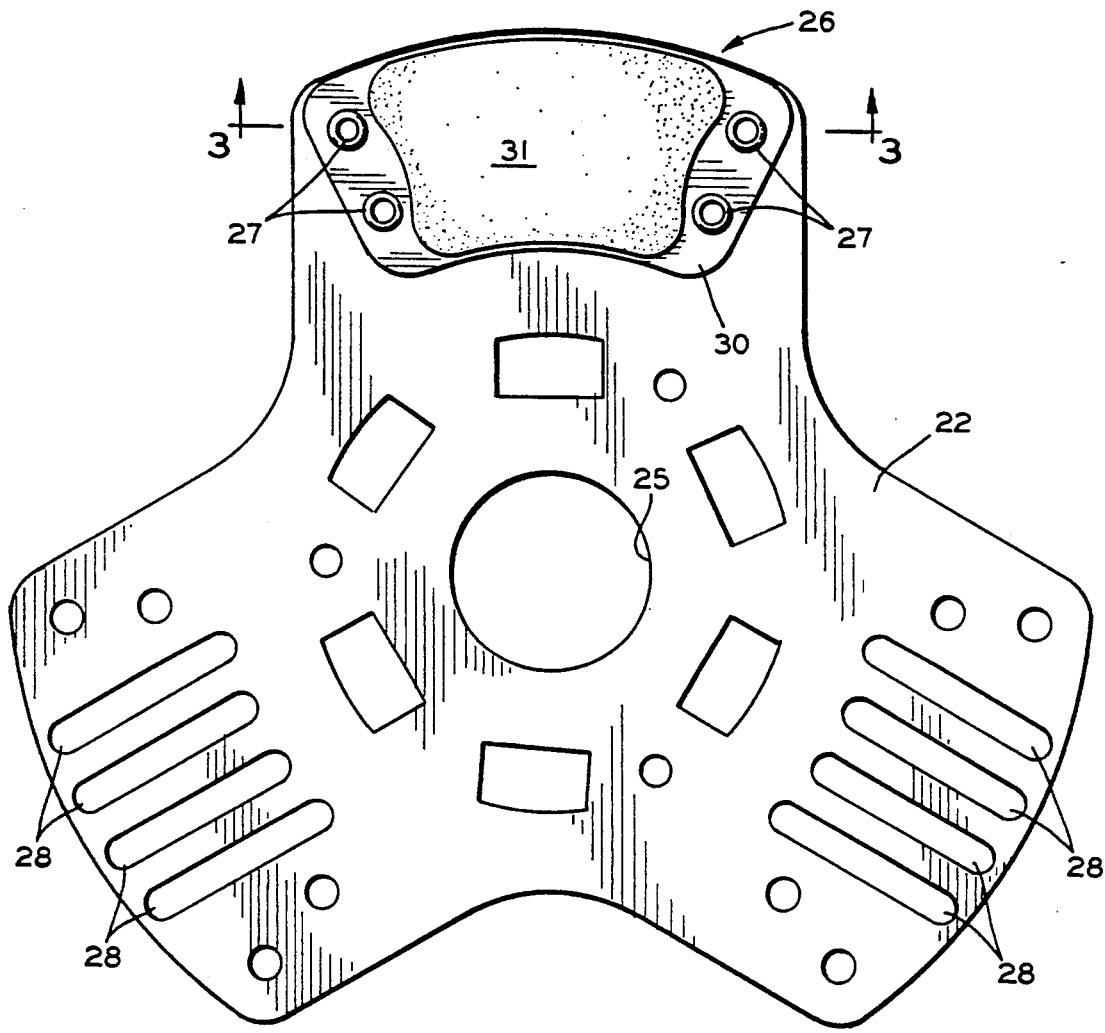
FIG. 2 is a front elevational view of a first embodiment of a support plate of the driven disc assembly illustrated in, FIG. 1, a friction element being shown secured to only one of the paddles of the support plate.
Figure 3:
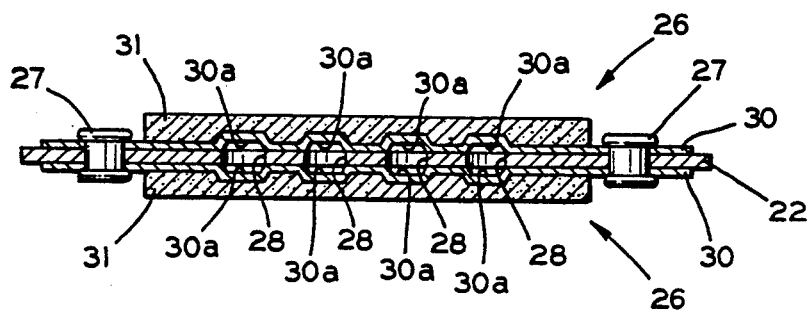
FIG. 3 is sectional elevational view taken along Line 3—3 of 2.

Referring now to FIGS. 2 and 3, it can be seen that the support plate 22 includes a plurality of paddles or legs which extend radially outwardly from a central opening 25. The central opening 25 receives the hub 21 therein for limited rotation relative to the support plate 22. Two friction elements, indicated generally at 26, are secured to opposed sides of each paddle, such as by rivets 27. In FIG. 2, the friction elements 26 have been omitted from two of the paddles for clarity. The friction elements 26 constitute the portions of the driven disc assembly 20 which are frictionally engaged between the flywheel 11 and the pressure plate 13 during use.

The support plate 22 is formed having a plurality of slots 28 formed therethrough in each of the paddles. In the embodiment illustrated in FIGS. 2 and 3, these slots 28 extend generally radially along the paddles. Although shown as extending parallel to a radius line bisecting the paddle, the slots 28 may also be formed radially themselves. Four of such slots 28 are formed through each of the paddles, although more or less may be formed if desired.

Each of the friction elements 26 includes a backing plate 30 and a friction facing 31. The backing plate 30 is formed from a metallic material and, as best shown in FIG. 3, is corrugated so as to define a plurality of raised channels 30a which extend away from the support plate 22. The sizes and locations of the raised channels 30a correspond to the sizes and locations of the slots 28 formed through the support plate 22. Thus, when the friction element 26 is secured to the support plate 22, as shown on the upper paddle in FIG. 2, the raised channels 30a are aligned with the slots 28. The friction facings 31 may be formed from any conventional material and are adhered or otherwise secured to the backing plates by any conventional means.

In operation, the friction elements 26 are frictionally engaged when the pressure plate 13 is moved toward the flywheel 11. As a result of this frictional engagement, heat is generated. However, as the driven disc assembly 20 is engaged, it begins to rotate with the other components of the clutch 10. Such rotation causes air to move about the driven disc assembly. As mentioned above, the aligned slots 28 formed through the support plate and 25 the raised channels 30a formed in the backing plates 30 permit an increased amount of air to flow therethrough during rotation. This increased air flow further cools backing plates 30 and, thus, the friction facings 31. The support plate 22 is also cooled. As a result, the friction facings 31 and support plate 22 are constantly ventilated and more quickly dissipate the heat generated during frictional engagement of the clutch 10, reducing the likelihood of breakdown or failure of the friction facing 31 and the support plate 22 resulting from heat build up.

The slots 28 formed through the support plate 22 provide an additional advantage to the operation of the clutch 10. Such slots reduce the mass of the support plate 22 and, therefore, the rotating inertia thereof. It is desirable to reduce the inertia of the driven disc assembly 20 as much as possible to prevent unnecessary wear upon engagement of the clutch 10. Also, it is also desirable to reduce such inertia to facilitate the shifting of gears in the transmission. Thus, the improved driven disc assembly 20 of this invention accomplishes this objective also.

Lastly, the corrugations formed in the backing plate 30 function as an internal cushion for the friction elements 26 during engagement of the clutch. Such cushioning is desirable if the clutch 10 is engaged in an abrupt fashion, such as might occur if an operator's foot slipped off of the clutch release pedal or if the vehicle is operated by an unexperienced driver. The corrugations cushion the shock of sudden engagement of the support plate 22 between the flywheel 11 and the pressure plate 13. Consequently, undesirable noise and possible damage to the clutch assembly 10 is minimized.

Figure 4:
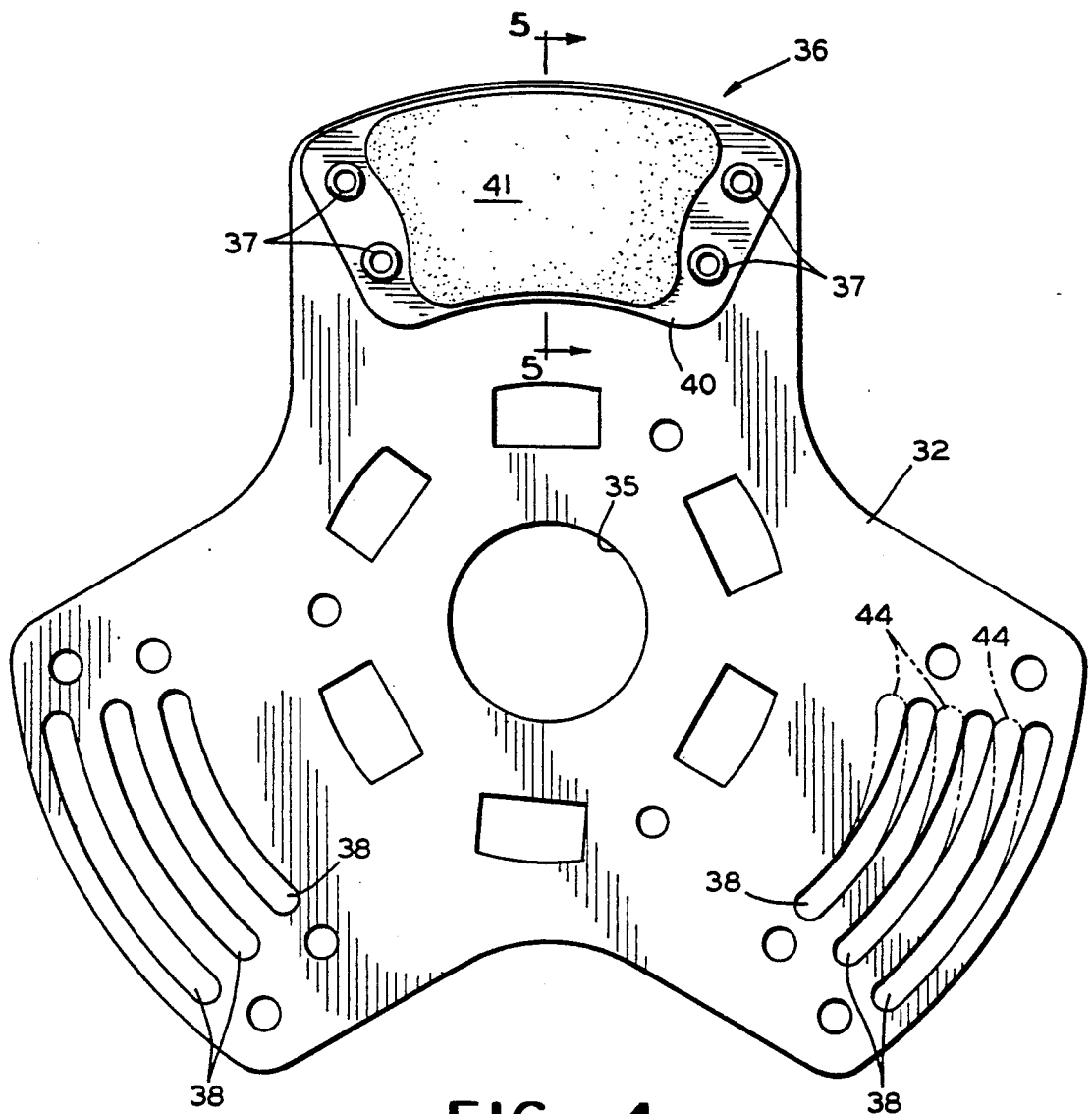
FIG. 4 a front elevational view of a second embodiment of a support plate of the driven disc assembly illustrate 1, a friction element again being shown secured to one of the paddles of the support plate.
Figure 5:
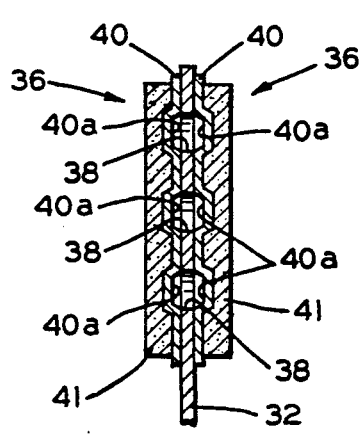
FIG. 5 is a sectional elevational view taken along Line 5—5 of FIG. 4.

Referring now to FIGS. 4 and 5, there is illustrated an alternate embodiment of a support plate 32 for the driven disc assembly 20. As shown therein, the support plate 32 includes a plurality of paddles or legs which extend radially outwardly from a central opening 35. The central opening 35 receives the hub 21 therein for limited rotation relative to the support plate 32. Two friction elements, indicated generally at 36, are secured to opposed sides of each paddle, such as by rivets 37. In FIG. 4, the friction elements 36 have been omitted from two of the paddles for clarity. The friction elements 36 constitute the portions of the driven disc assembly 20 which are frictionally engaged between the flywheel 11 and the pressure plate 13 during use.

The support plate 32 has a plurality of slots 38 formed therethrough in each of the paddles. In the embodiment illustrated in FIGS. 4 and 5, these slots 38 extend generally circumferentially along the paddles. Three of such slots 38 are formed through each of the paddles, although more or less may be formed if desired.

Each of the friction elements 36 includes a backing plate 40 and a friction facing 41. The backing plate 40 is formed from a metallic material and, as best shown in FIG. 5, is corrugated so as to define a plurality of raised channels 40a which extend away from the support plate 32. The sizes and locations of the raised channels 40a corresponds to the sizes and locations of the slots 38 formed through the support plate 32. Thus, when the friction elements 36 are secured to the support plate 32, as shown on the upper paddle in FIG. 4, the raised channels 40a are aligned with the slots 38. The friction facings 41 may be formed from any conventional material and are adhered or otherwise secured to the backing plates by any conventional means. The operation of support plate 32 and friction element 36 is similar to the operation described above with respect to support plate 22 and friction element 26, shown in FIGS. 2 and 3.

A further embodiment of the invention is illustrated in FIG. 6. As shown therein, the ends of the slots 38 formed through the paddle have been modified curve radially inwardly, as shown as 44. The curved ends 44 are the trailing ends of the slots 38 when the support plate 32 rotates. These inwardly curved ends 44 further increase the flow of cooling air therethrough, resulting in increased cooling of the friction elements 36 and the support plate 32 during operation of the clutch 10.

In accordance with the provisions of the patent statutes, the principle and mode of operation of the present invention have been explained and illustrated in its preferred embodiments. However, it must be understood that the present invention may be practiced otherwise than as specifically explained and illustrated without departing from its spirit or scope.

What is claimed is:

1. A driven disc assembly for friction clutch comprising:
   a hub;
   a support plate including a central aperture receiving a portion of said hub to permit relative rotational movement therebetween about a common axis, said support plate further including at least one paddle extending radially outwardly from said central opening, said paddle having at least one slot formed therethrough;
   spring means extending between said hub and said support plate for providing a resilient rotational driving connection therebetween; and
   a friction element secured to one side of said paddle including a backing plate having a friction facing secured thereto, said backing plate having a corrugation formed therein defining a raised channel which is aligned with said slot when said friction element is secured to said paddle.

2. The invention defined in claim 1 wherein said slot and said corrugation extend generally radially outwardly.

3. The invention defined in claim 1 wherein said slot and said corrugation extend generally circumferentially.

4. The invention defined in claim 3 wherein one end of each of said generally circumferentially extending slot and corrugation curves radially inwardly.

5. The invention defined in claim 1 wherein a plurality of said slots and said corrugations are formed through said paddle and said backing plate.

6. The invention defined in claim 5 wherein said slots and said corrugations extend generally radially outwardly and are generally parallel.

7. The invention defined in claim 5 wherein said slots and said corrugations extend generally circumferentially and are generally concentric.

8. The invention defined in claim 7 wherein one end of each of said generally circumferentially extending slots and corrugations curves radially inwardly.

9. A support plate for use in a clutch driven disc assembly comprising:
   a plate including a central aperture formed therethrough to receive a portion of a hub of the driven disc assembly to permit relative rotational movement therebetween about a common axis; and
   at least one generally circumferentially extending slot formed through said plate, one end of said slot being curved radially inwardly.

10. The invention defined in claim 9 wherein a plurality of said slots are formed through said paddle.

11. A friction element for use in a clutch driven disc assembly comprising:
    a backing plate having having at least one corrugation formed therein defining a raised channel, said corrugation extending in a direction which is generally circumferential relative to the driven disc assembly to be secured thereto, one end of said corrugation being curved in a direction which is generally radially inwardly relative to the driven disc assembly to be secured thereto; and
    a friction facing secured to said backing plate.

12. The invention defined in claim 11 wherein a plurality of said corrugations are formed through said backing plate.

13. A driven disc assembly for friction clutch comprising:
    a hub;
    a support plate mounted on said hub, said support plate including an outer portion having at least one slot formed therethrough; and
    a friction element secured to one side of said outer portion of said support plate, said friction element including a backing plate having a friction facing secured thereto, said backing plate having a corrugation formed therein defining a raised channel which is aligned with said slot when said friction element is secured to said support plate.

14. The invention defined in claim 13 wherein said support plate is mounted on said hub for relative rotational movement about a common axis.

15. The invention defined in claim 13 further including spring means extending between said hub and said support plate for providing a resilient driving connection therebetween.

16. The invention defined in claim 13 wherein said slot and said corrugation extend generally radially outwardly.

17. The invention defined in claim 13 wherein said slot and said corrugation extend generally circumferentially.

18. The invention defined in claim 17 wherein one end of each of said generally circumferentially extending slot and corrugation curves radially inwardly.

19. The invention defined in claim 13 wherein a plurality of said slots and said corrugations are formed through said paddle and said backing plate.

20. The invention defined in claim 19 wherein said slots and said corrugations extend generally radially outwardly and are generally parallel.

21. The invention defined in claim 19 wherein said slots and said corrugations extend generally circumferentially and are generally concentric.

22. The invention defined in claim 21 wherein one end of each of said generally circumferential extending slots and corrugations curves radially inwardly.

* * * * *